United States Patent Office 3,646,120
Patented Feb. 29, 1972

3,646,120
ASPHALTENE-DERIVED SURFACTANT COMPOSITION AND ITS PREPARATION
Armin C. Pitchford, Bartlesville, Okla., assignor to Phillips Petroleum Company
No Drawing. Filed Feb. 7, 1969, Ser. No. 797,693
Int. Cl. C07c 63/00
U.S. Cl. 260—515 R                   19 Claims

ABSTRACT OF THE DISCLOSURE

A novel surfactant composition is produced by reacting asphaltenes with an anhydride or halide of one or more of the following dicarboxylic acids: maleic acid, succinic acid and glutaric acid, with the reaction product then being separated and neutralized with a water-soluble oxide or hydroxide of a Group II–A metal. The surfactant composition formed is useful in the preparation of stable water-in-oil emulsions and also for dispersing solid particles in an oily medium.

---

This invention relates to a novel surfactant composition (dispersant or emulsifying agent) which is particularly useful for the preparation of stable water-in-oil emulsions. In one aspect it relates to the discovery that asphaltenes or other asphaltic components can be incorporated into novel composition of matter which exhibits excellent emulsifying characteristics.

Asphalt (asphaltic bitumen) occurs in a solid or semisolid form in nature or is also obtained by refining petroleum and is a black to dark brown cementitious material which gradually liquefies when adequately heated.

The asphaltenes, which comprise as a rule over 30 percent of the natural asphalt, about 20 percent of the good petroleum asphalts and over 10 percent of the poor asphalts, are responsible for the hardness, color and body of the asphaltic bitumen. But of themselves they do not have sufficient cementic properties, and are generally regarded as the organic "filler" of the asphalt. Association of the asphaltenes in asphaltic bitumens exists at low temperatures, but dissociation begins to occur at elevated temperatures.

The asphaltenes are probably formed by condensation and dehydrogenation from naphthenic hydrocarbons of lower molecular weight. In character they are predominantly aromatic and have molecular weights generally ranging from 1000 to 3500. Asphaltenes are composed of from 80 to 90 percent carbon, 6 to 10 percent hydrogen, 0.6 to 8 percent sulfur and a small portion of oxygen and ash, with possibly nitrogen and traces of chlorine present.

The use of asphalt in the construction and repair of roads and pavements for sealing and waterproofing, for asphalt shingles, insulated backing and the like is very well known. What was not previously known, but is now revealed is that asphaltic materials, in particular asphaltenes, can be reacted with certain dicarboxylic anhydrides or halides, with the product of this reaction subsequently being reacted with a basic oxide or hydroxide to yield a novel surfactant composition.

Thus an object of this invention is to provide a new surfactant composition. Another object is to reveal a method for preparing a new surfactant composition. Another object is to provide a novel use for asphaltic materials. Still another object is to provide a material which will be useful in the preparation of water-in-oil emulsions. Yet still another object is to provide a material which will be useful as a suspending agent for dispersing solid particles in an oily medium.

The novel composition when used as an emulsifying agent enhances the ease of formation of an emulsion by reducing the interfacial tension between the two liquid phases and also promotes the stability of the emulsion. (The two phases of the emulsion consist of the dispersed or internal phase—that which is broken up into minute globules—and the continuous or external phase—that which is the surrounding liquid.)

Surfactants are in great demand today with over one billion pounds being consumed per year in the United States exclusive of detergent purposes. The inventive composition shows considerable promise as a dispersant or emulsifying agent for preparation of stable water-in-oil emulsions which may be suitable for use in oil-based drilling fluids, hydraulic fluids, etc., as well as suspending agents for dispersing solid particles in an oily medium.

Thus what I have discovered is that asphaltenes or other asphaltic components can be dissolved in a suitable aromatic solvent and then reacted with a specific dicarboxylic anhydride or halide to yield a reaction product which can be precipitated, usually with n-pentane, or another suitable liquid hydrocarbon, filtered out, washed, and then neutralized by a treatment with a suitable Group II–A metal hydroxide or oxide to yield a novel surfactant composition.

The asphaltenes used are obtainable from any naturally occurring or refinery produced asphalt. Of course, these different asphalts, especially those occurring naturally in various parts of the world, will possess somewhat different physical, chemical and structural properties. Yet they are all suitable and within the scope of this invention, although the quality of the surfactant composition may vary to some degree. In particular, I found Wafra asphaltenes to be quite satisfactory in obtaining a surfactant product with the desired properties. Wafra asphaltenes were obtained by Wafra (Middle East) vacuum reduced crude oil by being desalted, topped and vacuum reduced to yield the 1025° F+ residuum. This residuum (reduced crude) was then solvent extracted using n-pentane to obtain the desired asphaltenes. This is just one method for obtaining the needed asphaltenes, and the invention is not to be limited in any fashion by or to this method since the manner of procuring the asphaltenes is not within the scope of the patentable subject matter of this invention. Thus asphaltenes obtained by any known process will make a suitable starting material for the inventive composition.

Once the asphaltenes or other asphaltic components are obtained, they must be first dissolved. This can be best accomplished using an aromatic solvent. I have found that any aromatic solvent having from 6 to 12 carbon atoms per molecule is suitable. The preferred solvents include benzene and its alkyl substituted derivatives, such as toluene, the xylenes, trimethylbenzene and ethylbenzene. Any suitable amount of solvent that will completely dissolve the asphaltene will be satisfactory. Yet great excesses of solvent should be avoided since the efficiency of the process for the production of the surfactant composition will be adversely affected due to the fact that a major portion of any excess solvent should be removed by distillation after the reaction between the asphaltenes and the anhydride (or halide) has been completed. Therefore the solvent should generally be added in the range of from about 1 ml. to about 50 ml. per gram of asphaltene to be dissolved, with the preferred range being from about 5 ml. to about 25 ml. of solvent per gram of asphaltene.

Once the asphaltene has been dissolved in the appropriate solvent, a suitable dicarboxylic acid anhydride or dicarboxylic acid halide is added and reacted with the dissolved asphaltene. The acceptable anhydrides and halides within the scope of this invention are formed from the following three dicarboxylic acids: maleic acid, succinic acid and glutaric acid. Thus the suitable dicarboxylic acid anhydrides are maleic anhydride, succinic anhydride, glutaric anhydride, or mixtures thereof.

The dicarboxylic acid halides that are suitable include the chlorides, the bromides and the iodides. Specifically, the following are all acceptable: malonyl dichloride, dibromide and diiodide; succinyl dichloride, dibromide and diiodide; and glutaryl dichloride, dibromide an diiodide. In addition mixtures of the chlorides, bromides and iodides can also be satisfactorily employed. Of the above-mentioned halides, it is preferable to use the dichlorides in this inventive process.

The ratio of anhydride (or halide) added to the amount of asphaltene dissolved can vary considerably and still be within the scope of the invention. Based on an average molecular weight of the asphaltenes being in the range of 2000–3500, is has been found that the weight ratio of anhydride (or halide) to asphaltenes can range of from about 1:35 to about 2:1 with the preferred range being about 1:8 to about 1:1.

The reaction between the asphaltenes and the suitable dicarboxylic acid anhydride or dicarboxylic acid halide is initiated by heating the reactants at or near the normal boiling temperature of the solvent until the reaction has been essentially completed. Preferably the heating is carried out in the form of a refluxing operation since the reaction will more readily go to completion and also any water formed can be more easily removed. The actual nature of the reaction is not clearly understood at this time and therefore will not be discussed. The reaction temperature is in the range of from about 80° C. to about 250° C. The preferred temperature is in the range of from about 100 to about 200° C.

The heating operation can be carried out at atmospheric pressure although an increase in pressure will speed up the reaction. The reaction time can be as short as a minute and as long as many, many hours in some instances. Therefore the broad range of reaction times will be from about one minute to about 100 hours, with the normal range being from about 15 minutes to about 10 hours, since in few instances will over 10 hours ever be necessary. Within this broad range the actual reaction time used can vary depending on the yield and purity of product desired and does not go to the essence of the discovery of the novel surfactant composition. Therefore this is not a limiting feature of this invention.

Upon completion of the reaction, it is generally desirable to remove all or at least a substantial portion of the solvent present through distillation or some other suitable means. The removal of a portion of the solvent is not essential to this process, but it is desirable since the next step in the process can be more easily carried out if the volume of the reaction mixture is reduced a given amount. The amount removed can be from less than 1% to 100% of the solvent present, and it is preferred to remove anywhere from about 10% to about 90% of this solvent. It is possible to remove all the solvent and recover the product precipitation step. Yet the reaction product recovered in this manner contains many impurities and generally is also tacky and not easily handled. Therefore it is more convenient to remove only a portion of the solvent and thus keep the reaction product essentially in solution until this precipitation step.

Once the desired amount of solvent has been removed, the precipitation step is performed by adding the remainder of the reaction mixture to a suitable liquid hydrocarbon to precipitate the reaction product. The preferred hydrocarbon is pentane with other acceptable paraffinic hydrocarbons within the scope of this invention selected from propane, butane, hexane, heptane, petroleum ether and mixtures thereof. The amount of liquid paraffinic hydrocarbon to be employed is an amount sufficient to precipitate the reaction product formed between the asphaltenes and the carboxylic acid anhydride or halide. Although any large excess of pentane or other suitable liquid hydrocarbon will be acceptable, it has been found that an amount in the range from about 1 ml. to about 20 ml. per ml. of the reaction mixture will generally be sufficient to precipitate the reaction product.

The reaction product precipitated in this manner is then recovered from this mixture by any suitable separation means, such as filtration, then it can be water washed until free of acid, and finally dried for a period of time at an elevated temperature which is generally within the range of from about 40° C. to about 150° C.

When the optional drying step has been completed, the final step consists of dispersing the recovered reaction product in water and neutralizing it with an excess of a water soluble oxide or hydroxide of a Group II–A metal, said group being designated in the Periodic Table in the Handbook of Chemistry and Physics, Chemical Rubber Company, 45th edition (1964), page B–2. The preferred metals selected from this group include calcium, magnesium and barium. The amount of the neutralizing agent added should be enough to raise the pH of the mixture above 7. It is preferred that the final pH be in the range from 8–10.

The product thus formed, although not capable of being accurately defined structurally and chemically, is found to possess properties which make it extremely useful as a surfactant composition.

A more comprehensive understanding of the invention can be obtained through the following illustrative example, which is not intended to in any way limit the scope of this invention.

EXAMPLE 40 grams of asphaltenes having a molecular weight of approximately 3000 and a weight percentage analysis of:

| | |
|---|---|
| Carbon | 82.7 |
| Hydrogen | 8.1 |
| Oxygen | 0.67 |
| Nitrogen | 0.71 |
| Sulfur | 7.70 | were dissolved in 500 ml. of xylene and 25 grams of maleic anhydride was then added. The resulting mixture was then refluxed for five hours, after which about 250 ml. of the xylene was removed by distillation.

The remainder of the reaction mixture was then poured into about 2 liters of n-pentane to precipitate the reaction product. The precipitated product was removed by filtration, washed with water until free of acid, and then dried in several batches at 93°–107° C. for 2–5 hours. After drying, about one gram of the asphaltene product was dispersed in 25 ml. water and neutralized with excess CaO. The novel composition formed exhibited excellent properties as a dispersant or emulsifying agent. This was demonstrated by taking the neutralized suspension formed and adding about 25 ml. of heavy lubricating oil to it. This mixture was stirred vigorously to yield a stable emulsion of the w/o (water/oil) type. In a similar test toluene was used instead of the lube oil, a stable w/o emulsion was also produced.

As will be evident to those skilled in the art, many variations and modifications of the invention can be practiced in view of the foregoing disclosure without departing from the spirit and scope of the invention.

I claim:
1. A process for producing a surfactant composition which comprises
    (a) dissolving an asphaltene in an aromatic solvent having from 6 to 12 carbon atoms per molecule;
    (b) adding at least one compound selected from the group consisting of the anhydrides and halides of maleic acid, succinic acid and glutaric acid;
    (c) heating the mixture formed in steps (a) and (b) in the temperature range of from 80° C. to about

250° C. thereby initiating a reaction between the asphaltenes and the compound of step (b); and (d) separating and recovering the reaction product formed during the heating phase of the process.

2. A process of claim 1 wherein the reaction product from step (d) is neutralized with at least one compound selected from the water-soluble oxides and hydroxides of Group II–A metals.

3. A proces according to claim 1 wherein the compound added in step (b) is a compound selected from the group consisting of maleic anhydride, succinic anhydride, glutaric anhydride, and mixtures thereof.

4. A process according to claim 1 wherein said heating comprises a refluxing operation.

5. A process according to claim 2 wherein said separating is accomplished through a precipitation step which comprises adding the reacted mixture of step (c) to a liquid paraffinic hydrocarbon selected from the group consisting of pentane, propane, butane, hexene, heptane, petroleum ether and mixtures thereof, thus precipitating the reaction product.

6. A process according to claim 5 wherein the recovered reaction product is water washed to remove any acid present and is then dried at an elevated temperature before being neutralized.

7. A process according to claim 6 wherein the weight ratio of the compound of step (b) to the asphaltenes is in the range of from about 1:35 to about 2:1, based on an average molecular weight of the asphaltenes being in the range of 2000–3500.

8. A process according to claim 7 wherein an amount of from about 10% to 90% of the solvent present after the reflux is removed before the reacted mixture is added to the liquid paraffinic hydrocarbon.

9. A process according to claim 1 wherein said compound added in step (b) is maleic anhydride.

10. The product formed according to the process of claim 9.

11. A process according to claim 9 wherein the reaction product from step (d) is neutralized with at least one compound selected from the water-soluble oxides and hydroxides of Group II–A metals.

12. A process according to claim 10 wherein said heating comprises a refluxing operation.

13. A process according to claim 11 wherein said separating is accomplished through a precipitation step which comprises adding the reacted mixture of step (c) to a liquid paraffinic hydrocarbon selected from the group consisting of pentane, propane, butane, hexene, heptane, petroleum ether and mixtures thereof, thus precipitating the reaction product.

14. A process according to claim 13 wherein the recovered reaction product is water washed to remove any acid present and is then dried at an elevated temperature before being neutralized.

15. A process according to claim 14 wherein the weight ratio of maleic anhydride to asphaltene is in the range of from about 1:35 to about 2:1.

16. A process according to claim 15 wherein an amount of from 10 percent to 90 percent of the solvent present after the reflux is removed before the reacted mixture is added to the liquid paraffinic hydrocarbon.

17. A process according to claim 16 wherein said aromatic solvent is xylene.

18. A process according to claim 17 wherein said liquid paraffinic hydrocarbon is pentane.

19. A proces according to claim 18 wherein said Group II–A water-soluble oxide or hydroxide is calcium oxide.

No references cited.

JAMES A. PATTEN, Primary Examiner

U.S. Cl. X.R.

252—356; 260—515 H, 515 P

UNITED STATES PATENT OFFICE

CERTIFICATE OF CORRECTION

Patent No. 3,646,120                      Dated: February 29, 197

Armin C. Pitchford

It is certified that error appears in the above-identified patent and that said Letters Patent are hereby corrected as shown below:

Column 4, line 75, after "from" insert — about —; column 6, line 5, delete "10" and insert — 11 —; column 6, line 7, delete "11" and insert — 12 and column 6, line 11, delete "hexene" and insert — hexane —.

Signed and sealed this 18th day of July 1972.

(SEAL)
Attest:

EDWARD M. FLETCHER, JR.                     ROBERT GOTTSCHALK
Attesting Officer                               Commissioner of Patents